United States Patent
Wolkersdorfer et al.

(10) Patent No.: US 7,422,271 B2
(45) Date of Patent: Sep. 9, 2008

(54) PASSENGER CELL FOR A PASSENGER VEHICLE

(75) Inventors: Werner Wolkersdorfer, Neuhausen (DE); Terence Tattersall, Rochester Hills, MI (US); Fred Winter, Rutesheim (DE); Dietmar Krase, Stuttgart (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/141,389

(22) Filed: Jun. 1, 2005

(65) Prior Publication Data

US 2006/0273628 A1 Dec. 7, 2006

(51) Int. Cl.
B62D 25/08 (2006.01)
(52) U.S. Cl. ............... 296/193.02; 296/24.43
(58) Field of Classification Search ............ 296/193.02, 296/68.1, 24.4, 24.43; 280/756
See application file for complete search history.

(56) References Cited

U.S. PATENT DOCUMENTS

| | | | |
|---|---|---|---|
| 3,517,765 A * | 6/1970 | Eggert, Jr. et al. ............ | 180/312 |
| 3,944,276 A * | 3/1976 | de Rosa et al. ............ | 296/65.13 |
| 4,512,604 A * | 4/1985 | Maeda et al. ............... | 296/68.1 |
| 5,435,618 A * | 7/1995 | Sacco et al. ............ | 296/187.12 |
| 5,588,694 A * | 12/1996 | Koehr ................... | 296/187.13 |
| 6,168,228 B1 | 1/2001 | Heinz et al. | |
| 6,568,745 B2 * | 5/2003 | Kosuge et al. ......... | 296/193.02 |
| 2003/0173134 A1 * | 9/2003 | Unfried et al. ............. | 180/312 |
| 2005/0134091 A1 * | 6/2005 | Rashidy et al. ......... | 296/203.01 |
| 2005/0140129 A1 * | 6/2005 | Miki et al. ................... | 280/756 |
| 2005/0161967 A1 * | 7/2005 | Rashidy et al. .......... | 296/65.01 |
| 2005/0161980 A1 * | 7/2005 | Rashidy et al. ......... | 296/193.02 |

FOREIGN PATENT DOCUMENTS

| | | |
|---|---|---|
| DE | 198 11 215 A1 | 9/1999 |
| DE | 199 43 296 A1 | 3/2001 |
| DE | 10 2004 039 478 A1 | 3/2005 |
| EP | 1 547 874 A1 | 6/2005 |
| FR | 2 698 600 A1 | 6/1994 |
| JP | 2-41987 A | 2/1990 |

* cited by examiner

*Primary Examiner*—Dennis H. Pedder
*Assistant Examiner*—Mike Hernandez
(74) *Attorney, Agent, or Firm*—Crowell & Moring LLP

(57) ABSTRACT

A passenger cell for a passenger vehicle has a B-pillar on each side of the vehicle body. To increase the transverse rigidity of the passenger cell in side impact loads behind the front seats, a device is provided which has a closed hollow beam extending approximately horizontally across the longitudinal direction of the vehicle with lateral ends of the device connected to the adjacent B-pillars. To create an effective device for increasing the transverse rigidity of the passenger cell for a two-door passenger vehicle having only front seats and a mid-engine placement, the device situated approximately at the shoulder height of a vehicle occupant includes a central hollow beam offset to the rear in relation to the B-pillars and connected in a force-transmitting manner to the B-pillars in front at its two laterally exterior ends via side parts that are seen as curved from above.

20 Claims, 5 Drawing Sheets

PASSENGER CELL FOR A PASSENGER VEHICLE

BACKGROUND AND SUMMARY OF THE INVENTION

This invention relates to a passenger cell for a passenger vehicle having one B-pillar on each side of the vehicle body, a device being provided to increase the transverse rigidity of the passenger cell in side impact loads behind the front seats, said device comprising a closed hollow beam running approximately horizontally across the longitudinal direction of the vehicle, lateral ends of the device connected to the adjacent B-pillars.

French Patent 2 698 600 A1 discloses a passenger compartment for a passenger vehicle having one B-pillar on each side of the vehicle body, whereby to increase the transverse rigidity of the passenger compartment in the event of side impact loads behind the front seats, a device formed by a closed hollow beam running approximately horizontally across the longitudinal direction of the vehicle is provided. This hollow beam directly connects the two opposite B-pillars and is fixedly attached thereto. When seen in the height direction, this hollow beam runs approximately at the level of a seat cushion of a rear seat system.

An object of this invention is to create an effective device for increasing the transverse rigidity of the passenger cell for a 2-door mid-engine passenger vehicle having only front seats, such that the free design of the front seats is not impaired with regard to their adjustability in the longitudinal direction of the vehicle and the inclination of the backrest.

This object is achieved according to this invention by providing a passenger cell for a passenger vehicle having a B-pillar on each side of the vehicle body, a device being provided to increase the transverse rigidity of the passenger cell in side impact loads behind the front seats, said device comprising a closed hollow beam running approximately horizontally across the longitudinal direction of the vehicle, lateral ends of the device being connected to the adjacent B-pillars, wherein the device is situated approximately at a shoulder height of a vehicle occupant and comprises a central hollow beam offset to the rear in relation to the B-pillars and connected in a force-transmitting manner at its two laterally exterior ends to the B-pillars which are in front as seen in the longitudinal direction of the vehicle via curved side parts as seen from above. Additional features embodying the invention in an advantageous manner are described herein and in the claims.

Important advantages achieved with this invention can be regarded as the fact that the device consisting of a central hollow beam and two curved side parts arranged approximately at the shoulder height of a vehicle occupant ensures good functioning in the event of a side impact while also ensuring a large adjustment range for the front seats in the longitudinal direction of the vehicle and the angular adjustability of the backrest.

The central longitudinal beam is formed by a rectangular tube of high-strength material, the cross section of this rectangular tube and the wall thickness being designed so that high forces can be absorbed in the transverse direction. The offset of the hollow beam in the longitudinal direction in relation to the two upstream B-pillars in front ensures the displaceability and angular adjustability of the front seats. The hollow beam is preferably connected via a central holder to a top side of a dome-shaped receptacle space underneath. The curved side parts of the device are connected at their outer ends to the adjacent B-pillar and they can effectively transmit forces because they are designed like hollow beams. Additional rear supporting elements running between the side parts and the dome-shaped receptacle space ensure together with the side parts that the forces can be transmitted effectively both forward and to the rear. The hollow beam may also be used for defining a curved element to secure the parcels situated behind it in the longitudinal direction.

Other objects, advantages and novel features of the present invention will become apparent from the following detailed description of the invention when considered in conjunction with the accompanying drawings.

An exemplary embodiment of this invention is illustrated in the drawings and explained in greater detail below.

DETAILED DESCRIPTION OF THE INVENTION

Figure 1:
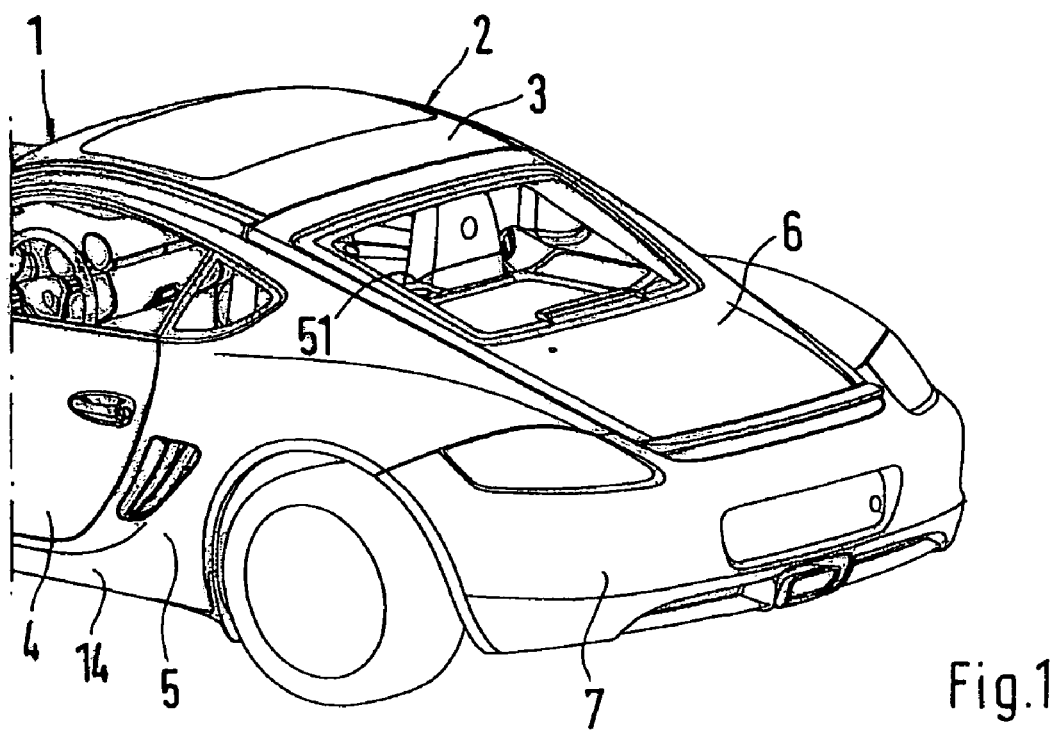
FIG. 1 shows a perspective partial view of a passenger vehicle as seen obliquely from the rear; constructed according to preferred embodiments of the invention.

A passenger vehicle 1 formed as a sports car has a body structure 2 comprising in the area shown here a roof 3, side doors 4, rear side parts 5, a pivotable trunk hatchback 6 and a rear end part 7.

Figure 2:
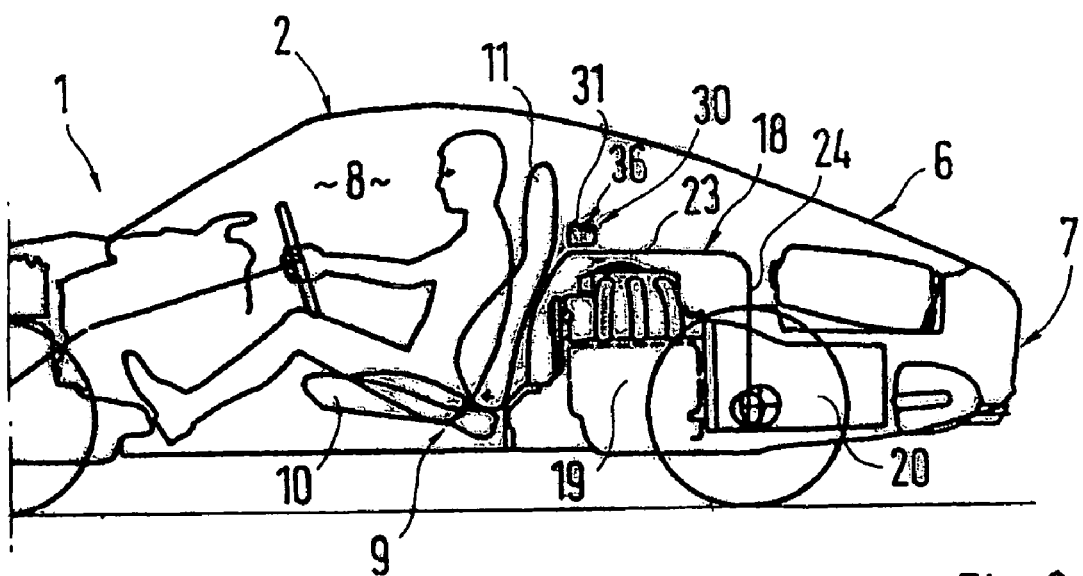
FIG. 2 shows a side view of the passenger vehicle of FIG. 1 in a schematic diagram.

The passenger vehicle 1, which has only two side doors 4, has a passenger compartment 8 in which seats 9 for a driver and a passenger are provided. Each seat 9 consists of a bottom seat part 10 and a backrest 11 connected to the seat part 10 in an articulated connection. The seat part 10 is designed to be displaceable in the longitudinal direction C-C of the vehicle, and the backrest 11 is adjustable in its inclination. FIG. 2 shows the farthest rear position of seat 9.

Figure 3:
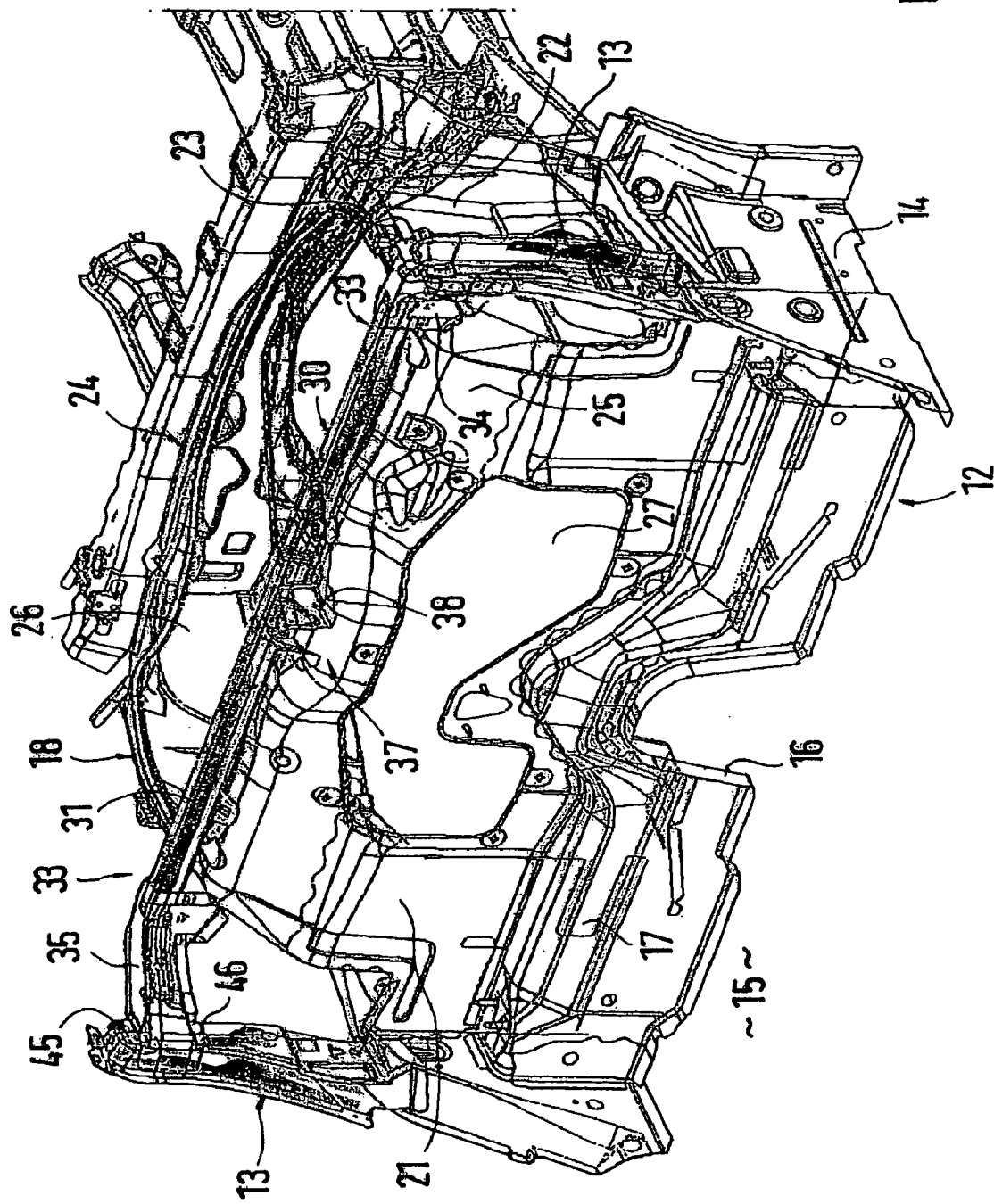
FIG. 3 shows a perspective view of a passenger compartment of the passenger vehicle of FIGS. 1 and 2 as seen obliquely from the front in the area of the B-pillars.

According to FIG. 3, a passenger compartment 12 of the passenger vehicle 1 includes an upright B-pillar 13 running approximately up to the level of a window ledge on each side of the vehicle body, said pillar being connected at its lower edge to an adjacent frame 14 for side spoilers as well as a vehicle bottom 15 and a central tunnel 16.

Figure 4:
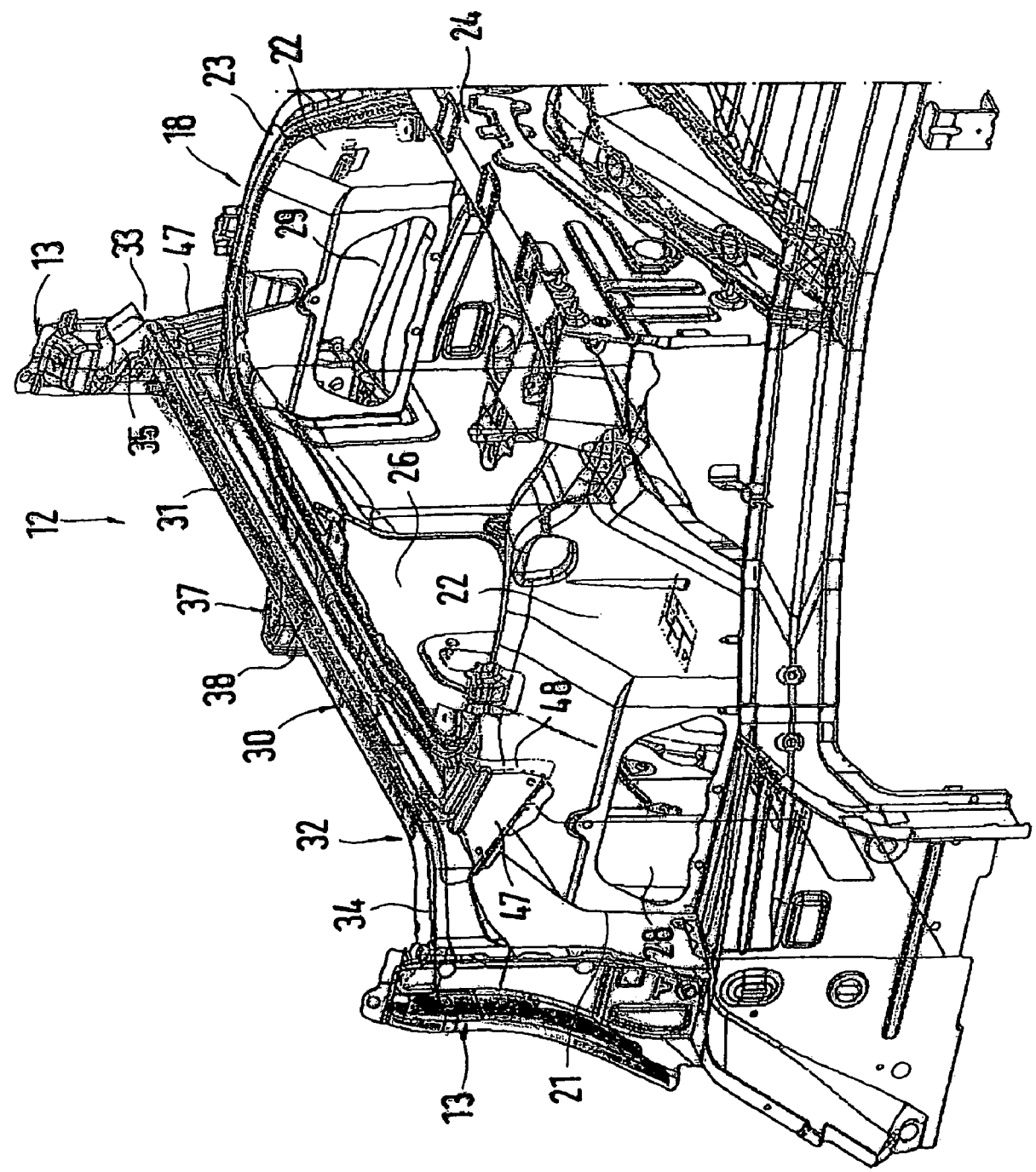
FIG. 4 shows a perspective view of the passenger compartment as seen obliquely from the rear in the area of the B-pillars.

The two B-pillars 13 are joined together by a lower crossbeam structure 17 in the area of the vehicle bottom 15 and are connected to the central tunnel 16 in a force-transmitting manner. Adjacent to the backrest 11 of the seats 9, the passenger compartment 12 includes a dome-like receptacle space 18 which protrudes upward and accommodates a transmission 20 of a drive mechanism arranged following it and accommodates a central engine 19 (FIG. 2). The dome-like receptacle space 18, open toward the rear, comprises a forward wall section 21 running transversely, lateral upright wall sections 22, an upper wall section 23 and a rear transverse wall section 24. The front wall section 21 is inclined downward in an upper area 25. Openings 26, 27 provided on the front and upper wall sections 21, 23 of the dome-like receptacle space 18 can be closed completely by covers (not shown here). Furthermore, openings 28, 29 for admitting and discharging air to the central engine 19 are provided in the front areas of the lateral wall sections 22 of the receptacle space 18 (FIG. 4).

To increase the transverse rigidity of the passenger cell 12 in side impact loads, a device 30 is provided approximately at the shoulder height of a vehicle passenger, said device comprising a central closed hollow beam 31 running approximately horizontally transverse to the longitudinal direction C-C of the vehicle, connected at its two ends 32, 33 that are on the outside laterally at least to the B-pillars 13 which are in front as seen in the longitudinal direction C-C of the vehicle in a manner suitable for transmitting forces via curved side parts 34, 35 as seen in a view from above. The hollow beam 31, which is closed as seen in cross section, has a linear form along its transverse extent and is formed in the exemplary embodiment by a rectangular tube made of a high-strength material. The cross-sectional shape and the wall thickness of the rectangular tube are selected so that high forces can be absorbed in the transverse direction of the vehicle. Instead of the rectangular tube, however, a tube with a round, oval or polygonal cross section may also be used. A hollow beam 31 made of pressed sheet-metal parts would also be conceivable here.

Figure 5:
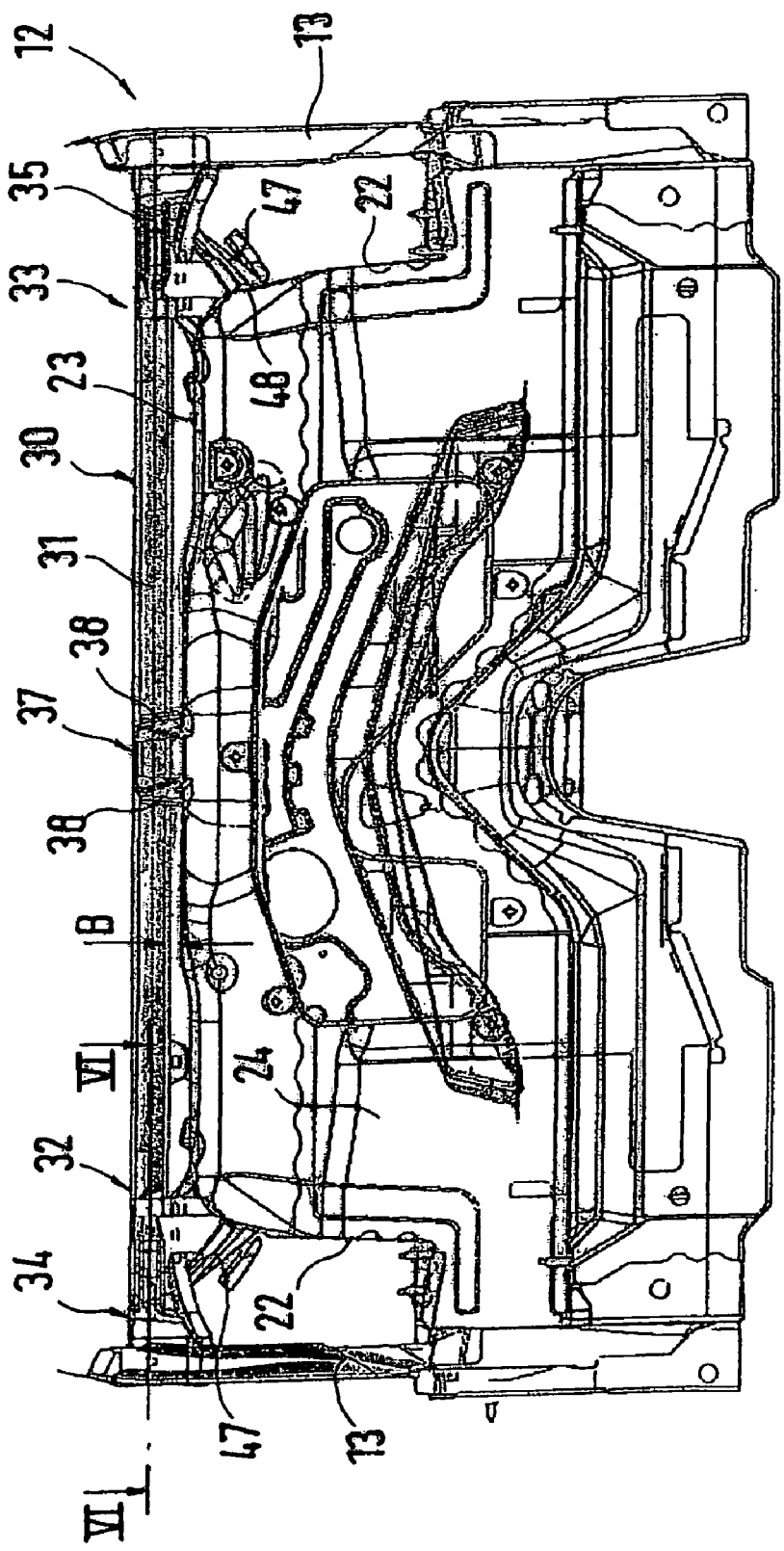
FIG. 5 shows a view of the passenger compartment in the area of the B-pillars as seen from the rear.
Figure 6:
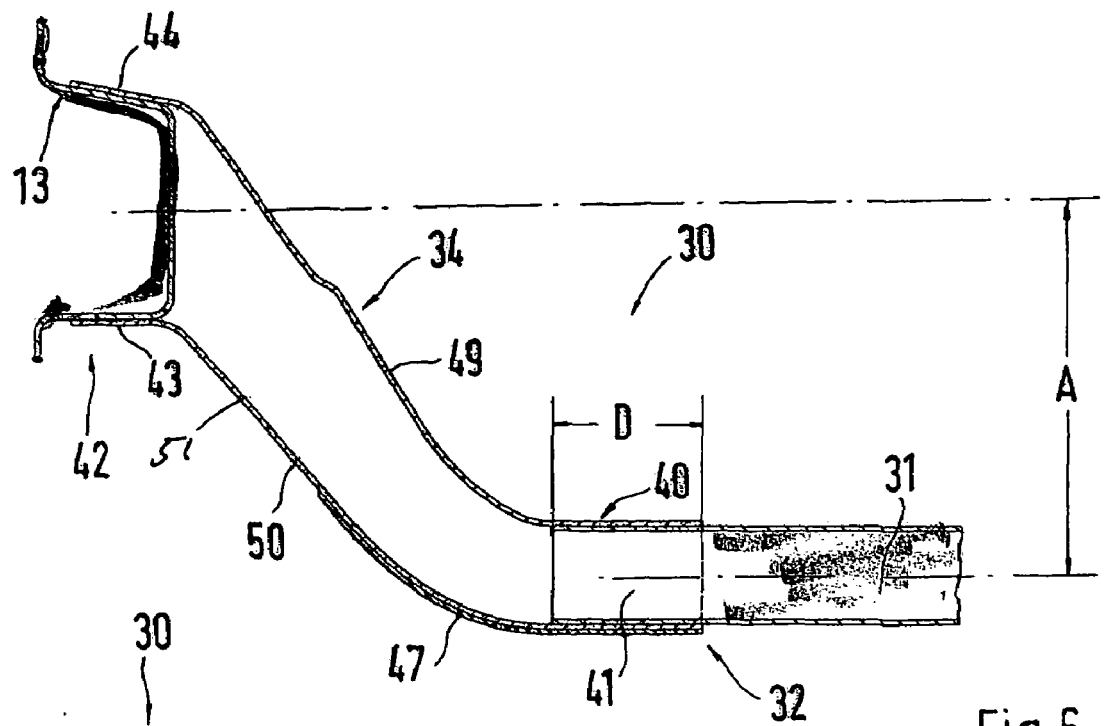
FIG. 6 shows a section along line VI-VI in FIG. 5 on a larger scale.

The hollow beam 31 runs as seen in the longitudinal direction C-C of the vehicle offset to the rear by a distance A in relation to the B-pillars 13 in front, namely above and in a front-end area 36 of the receptacle space 18 designed in the shape of a dome of the passenger cell 12 (FIG. 6). A continuous gap (distance B) extends between the top side of the upper wall section 23 of the receptacle space 18 and the bottom side of the hollow beam 31 (FIG. 5). The hollow beam 31 running transversely over almost the entire interior width is connected to the upper wall 23 of the receptacle space 18 with at least one holder 37 connected in between. In the exemplary embodiment, a central holder 37 is provided. However, multiple holders 37 arranged so they are spaced a distance apart in the transverse direction could also be provided for the hollow beam 31.

Figure 7:
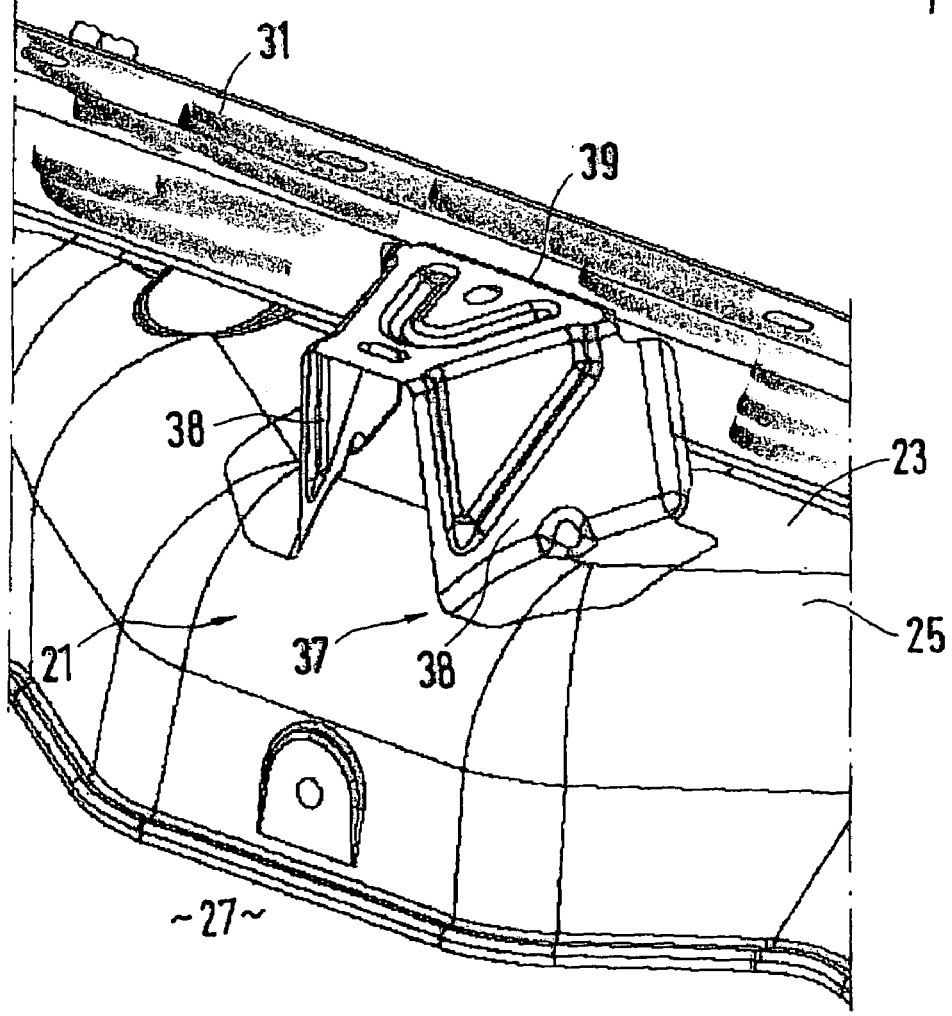
FIG. 7 shows a perspective partial view of the hollow beam and the holder of the device as seen obliquely from the front on a larger scale.

The holder 37 in front of the hollow beam 31 is placed on the upper wall 23 of the receptacle space 18 by means of two upright foot sections 38 and is connected to the front side of the hollow beam 31 by a transverse web 39 (see FIG. 7).

Each side part 34, 35 of the device 30 is formed in the exemplary embodiment by at least two pressed sheet-metal parts 49, 50 which are combined to form a closed hollow beam structure. An interior end 40 of each side part 34, 35 surrounds the hollow beam 31 like a shoe and is fixedly connected to the interior hollow beam 31, e.g., by welding, gluing, riveting or the like, in a joint overlap area 41. The overlap area 41 has a lateral extent D. The exterior end 42 of the side parts 34, 35 is connected to legs of the B-pillar 13 running in the same direction via transverse front and rear shoulders 43, 44 and is fixedly joined to thereto. The upper and lower shouldered flange 45, 46 of the side parts 34, 35 are also connected to an inner wall of the B-pillar 13 running in the same direction in the longitudinal direction C-C of the vehicle and fixedly connected thereto, e.g., by welding. However, the side parts 34, 35 may also be formed by cast parts.

An even more effective support and induction of forces is achieved by additionally connecting each side part 34, 35 to a lateral upper area 48 of the dome-like receptacle space 18 via a rear profiled supporting element 47.

A transverse curved element 51 may also be provided on the top side of the transverse hollow beam 31 for securing parcels, said element being fixedly anchored on the stable hollow beam 31.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Passenger cell for a passenger vehicle having a B-pillar on each side of the vehicle body, a device being situated approximately at a shoulder height of a vehicle occupant and provided to increase the transverse rigidity of the passenger cell in side impact loads behind front seats, said passenger cell comprising:
    a closed central hollow beam running approximately horizontally in a longitudinal direction of the vehicle and offset to the rear in relation to the B-pillars, and
    side parts that are curved as seen from above by which the closed hollow beam is connected in a force-transmitting manner at its two laterally exterior ends to the B-pillars,
    wherein the closed central hollow beam is displaced rearwardly of the B-pillars so that the B-pillars are entirely in front of the closed central hollow beam in the longitudinal direction of the vehicle;
    wherein the central hollow beam is connected to a receptacle area situated beneath it with at least one holder connected in between;
    wherein each side part is additionally connected to a front corner area of the receptacle area via a rear-profiled supporting element; and
    wherein the holder defines a bracket including a transverse web connected to the front side of the closed central hollow beam and a pair of foot sections connecting the transverse web to the receptacle area within which a vehicle engine is at least partially contained.

2. Passenger cell as claimed in claim 1, wherein the closed central hollow beam extends above and in a front-end area of said receptacle area, and wherein said receptacle area is an area of the passenger cell which protrudes upward in the manner of a dome.

3. Passenger cell as claimed in claim 1, wherein the closed central hollow beam has a closed cross section and is formed by a rectangular tube made of a high-strength material.

4. Passenger cell as claimed in claim 2, wherein the closed central hollow beam extends at a distance from an upper wall of the receptacle area of the passenger cell as seen in a height direction.

5. Passenger cell as claimed in claim 1, wherein the closed central hollow beam extends at a distance from an upper wall of a receptacle area of the passenger cell as seen in a height direction.

6. Passenger cell as claimed in claim 4, wherein the central hollow beam is connected to the receptacle area situated beneath it with said holder connected in between.

7. Passenger cell as claimed in claim 1, wherein each side part is formed by at least two pressed sheet-metal parts which are assembled to form a closed hollow beam structure.

8. Passenger cell as claimed in claim 1, wherein an interior end of each side part connects the closed central hollow beam in the manner of a shoe and is fixedly connected to the hollow beam in a joint overlap area.

9. Passenger cell as claimed in claim 2, wherein an interior end of each side part connects the hollow beam in the manner of a shoe and is fixedly connected to the hollow beam in a joint overlap area.

10. Passenger cell as claimed in claim 1, wherein respective exterior ends of the side parts of the device are connected to respective legs of the B-pillars running in the same direction via transverse front and rear shoulders.

11. Passenger cell as claimed in claim 4, wherein respective exterior ends of the side parts of the device are connected to respective legs of the B-pillars running in the same direction via transverse front and rear shoulders.

12. Passenger cell as claimed in claim 1, wherein respective ends of the side parts are connected to respective interior walls of the B-pillars directed in the same direction via upper and lower shouldered flanges running longitudinally.

13. Passenger cell as claimed in claim 4, wherein respective ends of the side parts are connected to respective interior walls of the B-pillars directed in the same direction via upper and lower shouldered flanges running longitudinally.

14. Passenger cell as claimed in claim 4, wherein each side part is additionally connected to a front corner area of the receptacle area via a rear-profiled supporting element.

15. Passenger cell according to claim 1, wherein the vehicle is a two-door two passenger vehicle.

16. A device for increasing transverse rigidity of a passenger cell for a passenger vehicle having B-pillars on opposite sides thereof without impairing longitudinal adjustability of front seats and inclination of front seat backrests comprising:

a hollow beam extending approximately horizontally of the vehicle, offset rearwardly in relation to the B-pillars so that the B-pillars are entirely in front of the hollow beam in a longitudinal direction of the vehicle, and including two laterally exterior ends, side parts that are curved as seen from above by which the hollow beam is connected at said two laterally exterior ends to the B-pillars, and a holder connected to a front side of the hollow beam and extending between the hollow beam and an upper wall section of a receptacle within which a vehicle engine is at least partially contained.

17. The device as claimed in claim 16, wherein the holder defines a bracket including a transverse web connected to the front side of the hollow beam and a pair of foot sections connecting the transverse web to the receptacle.

18. The device as claimed in claim 16, wherein the hollow beam extends above and in a front-end area of said receptacle, and wherein said receptacle protrudes upward in the manner of a dome.

19. The device as claimed in claim 16, wherein the hollow beam has a closed cross section and is formed by a rectangular tube made of a high-strength material.

20. The device as claimed in claim 18, wherein the hollow beam extends at a distance from an upper wall of the receptacle as seen in a height direction.

* * * * *